United States Patent [19]

Komorowski

[11] 4,189,427
[45] Feb. 19, 1980

[54] AZO DYESTUFFS FROM BENZENE DIAZO COMPONENT FUSED TO AN ALIPHATIC RING AND CONTAINING TWO CYANO SUBSTITUENTS ORTHO TO THE AZO GROUP

[75] Inventor: Klaus Komorowski, Cologne, Fed. Rep. of Germany

[73] Assignee: Bayer Aktiengesellschaft, Leverkusen, Fed. Rep. of Germany

[21] Appl. No.: 495,110

[22] Filed: Aug. 5, 1974

[30] Foreign Application Priority Data

Aug. 10, 1973 [DE] Fed. Rep. of Germany ....... 2340569

[51] Int. Cl.$^2$ ...................... C09B 29/06; C09B 29/24; C09B 29/32; C09B 29/34
[52] U.S. Cl. ................. 260/156; 260/146 R; 260/149; 260/151; 260/154; 260/155; 260/157; 260/158; 260/162; 260/165; 260/192; 260/193; 260/194; 260/195; 260/196; 260/197; 260/198; 260/199; 260/200; 260/201; 260/202; 260/203; 260/204; 260/205; 260/206; 260/207; 260/207.1; 260/207.5; 260/464; 260/465 D; 260/465 E
[58] Field of Search ............... 260/192, 196, 205, 206, 260/207, 207.1, 146 R, 149, 150, 151, 146 D, 154, 155, 156, 157, 147, 158, 162, 165, 193, 194, 195, 197, 200, 207, 203, 207.5

[56] References Cited

FOREIGN PATENT DOCUMENTS 1125683 8/1968 United Kingdom ............... 260/207.1

*Primary Examiner*—Charles F. Warren
*Attorney, Agent, or Firm*—Sprung, Felfe, Horn, Lynch & Kramer

[57] ABSTRACT

Azo dyestuffs of the formula

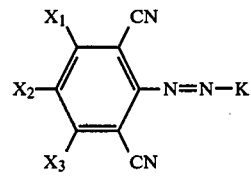

wherein
$X_1$ and $X_2$ denote alkyl, cycloalkyl, aralkyl or aryl or conjointly form the remaining members of a fused non-aromatic carbocyclic ring system,
$X_3$ denotes hydrogen, alkyl, aralkyl or aryl and
K represents the radical of a coupling component as well as their preparation and use for dyeing and printing synthetic fibre materials.

7 Claims, No Drawings

AZO DYESTUFFS FROM BENZENE DIAZO COMPONENT FUSED TO AN ALIPHATIC RING AND CONTAINING TWO CYANO SUBSTITUENTS ORTHO TO THE AZO GROUP

The invention relates to azo dyestuffs of the formula

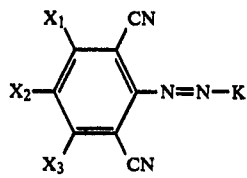   I wherein
- $X_1$ and $X_2$ denote alkyl, cycloalkyl, aralkyl or aryl or conjointly form the remaining members of a fused non-aromatic carbocyclic ring system,
- $X_3$ denotes hydrogen, alkyl, aralkyl or aryl and
- K represents the radical of a coupling component and their preparation and use.

Suitable alkyl radicals $X_1$, $X_2$ and $X_3$ are those with 1 to 6 C atoms, preferably methyl and ethyl.

Suitable cycloalkyl radicals $X_1$ and $X_2$ are 5-membered to 7-membered cycloalkyl radicals, preferably cyclopentyl, cyclohexyl and methylcylohexyl.

Suitable aralkyl radicals $X_1$–$X_3$ are benzyl and phenylethyl radicals which can be substituted in the nucleus, preferably monosubstituted, disubstituted or trisubstituted, by Cl, $C_1$–$C_4$-alkyl or $C_1$–$C_4$-alkoxy.

Suitable aryl radicals $X_1$–$X_3$ are above all phenyl radicals which can be substituted, preferably monosubstituted, disubstituted or trisubstituted by Cl, $C_1$–$C_4$-alkyl or $C_1$–$C_4$-alkoxy.

Where $X_1$ and $X_2$ conjointly form the remaining members of a carbocyclic ring system, these radicals preferably represent —$(CH_2)_n$—, wherein n=3, 4 or 5.

Examples of suitable radicals K are radicals of coupling components of the benzene, naphthalene, pyrazolone, acylacetic acid amide, aminopyrazole, indole, imidazole, pyridone, hydroxyquinoline and aminoquinoline series.

These radicals can optionally carry further non-ionic and/or anionic or cationic substituents.

By non-ionic substituents there are to be understood radicals customary in dyestuff chemistry, for example $C_1$–$C_4$-alkyl, $C_1$–$C_4$-alkoxy, $C_2$–$C_5$-alkylcarbonylamino or arylazo radicals and halogen atoms, such as fluorine, chlorine and bromine.

Suitable cationic substituents are, in particular, the customary ammonium groups.

Possible anionic substituents are the carboxylic acid, sulphonic acid and disulphimide groups.

Preferred dyestuffs are those of the formula I, wherein
K . . . for a radical of the formula

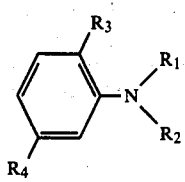   II in which
- $R_1$ and $R_2$ denote hydrogen, or an alkyl radical or aralkyl radical,
- $R_3$ represents hydrogen, halogen or an alkyl, alkoxy or aryloxy radical,
- $R_4$ represents hydrogen or an alkyl, alkoxy, nitrile, alkylsulphonyl, sulphamoyl, amino, acylamino or carbamoylamino group and
- $X_1$–$X_3$ have the abovementioned meaning.

Suitable alkyl radicals $R_1$ and $R_2$ are alkyl radicals with, preferably, 1 to 4 C atoms which are optionally monosubstituted by chlorine, bromine, nitrile, hydroxyl, acyl, acyloxy, alkoxy, amino, acylamino or ammonium groups.

Suitable aralkyl radicals $R_1$ and $R_2$ are, in particular, the benzyl and phenylethyl radical.

Suitable radicals $R_3$ are, in addition to hydrogen, above all chlorine atoms, methyl and ethyl radicals, methoxy and ethoxy radicals which are optionally substituted by hydroxyl or acyloxy groups, and phenoxy radicals.

Suitable alkyl and alkoxy radicals $R_4$ are, in particular, methyl, methoxy, ethyl and ethoxy radicals.

Preferably, $R_4$ represents acylamino and carbamoylamino groups.

The abovementioned acyloxy and acylamino radicals are in particular to be understood as formyl-, alkylcarbonyl-, arylsulphonyl- and alkoxycarbonyl-oxy and -amino radicals, possible alkyl and alkoxy radicals being, preferably, those with 1 to 4 C atoms, and possible aryl radicals being, preferably, phenyl radicals.

Particularly preferred dyestuffs of the formula I are those wherein
- $X_1$ and $X_2$ denote methyl, ethyl, phenyl or—conjointly —$(CH_2)_3$— or —$(CH_2)_4$— and
- $X_3$ denotes hydrogen, methyl, ethyl or phenyl and
- K represents the radical of the formula

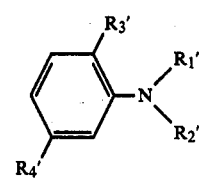   III in which
$R_1'$ and $R_2'$ represents hydrogen, —$CH_3$, —$C_2H_5$, —$C_3H_7$, —$C_4H_9$, —$CH_2C_6H_5$, —$CH_2CH_2OCOCH_3$, —$CH_2CH_2OCOC_2H_5$, —$CH_2CH_2OCOC_6H_5$, —$CH_2CH_2OCOCH_2C_6H_5$, —$CH_2CH_2OCOCH_2OC_6H_5$, —$CH_2CH_2OCOOCH_3$, —$CH_2CH_2OCOOC_2H_5$, —$CH_2CH_2COOCH_3$, —$CH_2CH_2COOC_2H_5$, —$CH_2CH_2CN$,

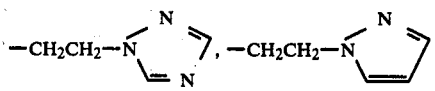

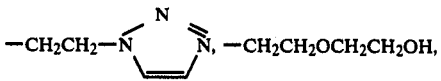

—$CH_2CH_2OCH_2CH_2OCOOCH_3$, —$CH_2CH_2OCH_2CH_2CN$,

-continued $-CH_2CH_2-\overset{\oplus}{N}(CH_3)_2$, $-CH_2CH_2-C_6H_5$,
                  |
                  $NH_2$ $-CH_2CH_2-\overset{\oplus}{N}\underset{}{\bigcirc}$  $-CH_2CH_2-\overset{\oplus}{N}\begin{matrix}CH_2-C_6H_5\\(CH_3)_2\end{matrix}$ or $-CH_2CH_2-\overset{\oplus}{N}(CH_3)_3$, $R_2'$ represents $R_1'$ or $-CH_2CH_2-N\underset{}{\overset{N}{\diagdown\diagup}}$, $-CH_2CH_2-N\underset{N}{\overset{N}{\diagdown\diagup}}$, $-CH_2CH_2-N\underset{}{\overset{N}{\diagdown\diagup}}-CH_2CH_2-N\underset{\overset{\oplus}{N}-CH_3}{\overset{N}{\diagdown\diagup}}$, $-CH_2CH_2-N\underset{\overset{\oplus}{N}-CH_3}{\overset{N}{\diagdown\diagup}}$ or $-CH_2CH_2-N\underset{\overset{\oplus}{N}-CH_3}{\overset{N}{\diagdown\diagup}}$ , $R_3'$ denotes hydrogen, $-CH_3$, $-C_2H_5$, $-OCH_3$, $-OC_2H_5$, $-OCH_2CH_2CN$ or $-Cl$ and $R_4'$ denotes hydrogen, $-CH_3$, $-C_2H_5$, $-OCH_3$, $-OC_2H_5$, $Cl$, $-NHCOC_nH_{2n+1}$, with n being 0-4, $-NHCOCH_2Cl$, $-NHCOCH_2OH$, $-NHCOCH_2OCOCH_3$, $-NHCOC_2H_5$ or $-NHCOC_6H_5$.

Amongst these, in turn, preference attaches to those dyestuffs (I) wherein $X_1$ and $X_2$ denote methyl, ethyl or - conjointly - $-(CH_2)_3-$ or $-(CH_2)_4-$, $X_3$ denotes hydrogen or methyl and the radicals $R_1'$ and $R_2'$ are free of heterocyclic substituents.

A further preferred group of dyestuffs are those of the formula I wherein $X_1-X_3$ have the abovementioned meanings and
K . . . for the radical of the formula $$\underset{HO}{\overset{Z_1}{\diagdown}}\underset{\underset{Z_3}{N}}{\diagup}\underset{O}{\overset{Z_2}{\diagdown}}$$  IV wherein $Z_1$ denotes OH, $C_1-C_4$-alkyl or phenyl which is optionally substituted by $C_1-C_4$-alkyl, $C_1-C_4$-alkoxy, F, Cl or Br, $Z_2$ denotes nitrile, aminocarbonyl, $C_1-C_4$-alkylaminocarbonyl, $C_1-C_4$-alkylcarbonyl, benzoyl or $C_1-C_4$-alkoxycarbonyl and $Z_3$ denotes hydrogen, $C_1-C_4$-alkyl which is optionally substituted by OH, CN or Cl, cyclohexyl, phenyl-$C_1-C_4$-alkyl, $C_1-C_4$-alkoxy or Cl-substituted phenyl.

Amongst these, in turn, preferred dyestuffs are those wherein $Z_1$ denotes methyl,
$Z_2$ denotes nitrile and
$Z_3$ denotes hydrogen or $C_1-C_2$-alkyl.

The new azo dyestuffs of the formula I can be prepared by combining diazotised anilines of the formula <chemical structure of benzene ring with X_1, X_2, X_3, CN, CN, NH_2 substituents>  V wherein $X_1-X_3$ have the abovementioned meaning with coupling components of the formula

H—K     VI in which
K has the abovementioned meaning.

The anilines (V) can advantageously be diazotised in concentrated . . . . or a mixture of concentrated sulphuric acid and concentrated o-phosphoric acid, by means of nitrosylsulphuric acid at temperatures around 0°C.

Suitable coupling components are: phenols, naphthols, aminonaphthalenes, acetoacetic ester anilides, pyrazolones, indoles, quinolines and also enolisable ketones and above all aminobenzenes and pyridones.

Amongst the series of the aminobenzenes there may be mentioned: aniline, 3-methylaniline, 2-methoxyaniline, 2,5-dimethylaniline, 2-methoxy-5-methylaniline, 2,5-diethoxyaniline, 3-chloroaniline, 1,3-phenylenediamine, N-ethylaniline, N-n-butylaniline, diphenylamine, N-(β-hydroxyethyl)-aniline, N-methyldiphenylamine, N-ethyldiphenylamine, N-(β,γ-dihydroxypropyl)-aniline, N-acetoacetylaminoaniline, N-(β-methoxyethyl)-aniline, N-(β-cyanoethyl)-aniline, N-(β-carbomethoxyethyl)-aniline, N-(β-chloro-ethyl)-aniline, N,N-dimethylaniline, N,N-diethylaniline, N,N-di-n-butylaniline, N,N-bis-(β-hydroxyethyl)-aniline, N,N-bis-(β-chloroethyl)-aniline, N,N-bis-(β-cyanoethylaniline), N,N-bis-(β-acetoxyethyl)-aniline, N,N-bis-(β-ethoxycarbonylethyl)-aniline, N,N-bis-(βmethoxycarbonyloxyethyl)-aniline, N,N-bis-δ-acetoxybutyl)-aniline, N-(methyl-, ethyl- or n-butyl)-N-(βhydroxyethyl)-aniline, N-(methyl-, ethyl-, n-propyl- or n-butyl)-N-(β-cyanoethyl)-aniline, N-ethyl-N-benzylaniline, N-benzyl-N-(β-cyanoethyl)-aniline, N-cyanoethyl-N-(β-(phenylaminocarbonyloxy)-ethyl)-aniline, N-ethyl-N-(βacetoxyethyl)-aniline, N-ethyl-N-(β-methoxyethyl)-aniline, N-(β-hydroxyethyl)-N-(β-cyanoethyl)-aniline, N-(β-acetoxyethyl)-N-(β-cyanoethyl)-aniline, N-ethyl-N-(β-chloroethyl)-aniline, N-ethyl-N-(β-hydroxy-γ-chloropropyl)-aniline, N-ethyl-N-(β-hydroxy-γ-cyanopropyl)-aniline, N-ethyl-N-(β-γ-diacetoxy-propyl)-aniline, N-ethyl-N-(ω-cyanoethoxyethyl)-aniline, N-ethyl-N-(β-benzylcarbonyloxyethyl)-aniline, N-β-cyanoethyl-N-(β-(phenoxymethylcarbonyloxy)-ethyl)-aniline, N-(β-hydroxyethyl)-N-(2'-bromopropen-2'-yl-1')-aniline, N-(β-cyanoethyl)-N-(β-benzoyloxyethyl)-aniline, N-ethyl-N-(β-vinylcarbonyloxy-ethyl)-aniline, N-(β- hydroxyethyl)-3-methylaniline, N-(β-cyanoethyl)-3-methylaniline, N-butyl-3-methylaniline, N-(β-carbomethoxyethyl)-3-methyl-aniline, N,N-diethyl-3-methylaniline, N-ethyl-N-(benzyl- or β-phenylethyl)-3-methyl-aniline, N-ethyl-N-(β-chloroethyl)-3-methyl-aniline, N-(ethyl- or butyl)-N-(β-acetoacetoxyethyl)-3-methylaniline, N-(methyl-, ethyl- or benzyl)-N-(β-cyanoethyl)-3-methyl-aniline, N-(ethyl- or n-butyl)-N-(β-hydroxyethyl)-3-methyl-aniline, N,N-bis-(β-hydroxyethyl)-3-methyl-aniline, N-(ethyl- or n-butyl)-N-(β-acetoxyethyl)-3-methyl-aniline, N-(β-hydroxyethyl)-N-(β-cyanoethyl)-3-methyl-aniline, N-ethyl-N-(β-hydroxy-γ-chloro-propyl)-3-methyl-aniline, N-ethyl-N-(β, γ-dihydroxypropyl)-3-methyl-aniline, N-ethyl-N-(β,N'-phthalimidoethyl)-3-methyl-aniline, N-(β-cyano-ethyl)-N-(β,N'-succinimidoethyl)-3-methyl-aniline, N-ethyl-N-(β-benzthiazolyl-2'-thioethyl)-3-methyl-aniline, N,N-bis-(β-acetoxyethyl)-3-methyl-aniline, N-ethyl-N-(β-carbomethoxyethyl)-3-methyl-aniline, N,N-bis-(β-methoxycarbonyloxyethyl)-3-methyl-aniline, N-methyl-N-(β-hydroxy-γ-methoxy-propyl)-3-methyl-aniline, N-(β-acetoxyethyl)-N-(β-cyanoethyl)-3-methyl-aniline, N,N-bis-(β-cyanoethyl)-3-methyl-aniline, N-(ethyl- or n-butyl)-N-(β-phenoxyethyl-3-methyl-aniline, N-(β-cyanoethyl)-N-(β-phenoxyethyl)-3-methyl-aniline, N-acetoacetylamino-2-chloroaniline, N,N-diethyl-3-chloro-aniline, N,N-bis-(β-acetoxyethyl)-3-chloro-aniline, N,N-bis-(β-benzoyloxyethyl)-3-chloro-aniline, N,N-bis-(β-cyanoethyl)-3-chloro-aniline, N,N-bis-(β-hydroxyethyl)-3-chloro-aniline, N,N-diethyl-3-methoxy-aniline, N,N-bis-(β-hydroxyethyl)-3-ethoxy-aniline, N-(β-cyanoethyl)-2-chloro-aniline, N,N-diethyl-3-trifluoromethyl-aniline, N,N-diethyl-3-cyano-aniline, N,N-diethyl-3-hydroxy-aniline, N-methyl-N-phenyl-4-ethoxy-aniline, 3-formylamino-aniline, 3-acetylamino-aniline, 3-(cyanoacetylamino)-aniline, 3-benzoylamino-aniline, N,N-dimethyl-3-acetylamino-aniline, N,N-diethyl-3-acetylamino-aniline, N,N-bis-(β-hydroxyethyl)-3-acetylamino-aniline, N,N-bis-(β-acetoxyethyl)-3-acetylamino-aniline, N,N-bis-(β-ethoxycarbonyloxyethyl)-3-acetylamino-aniline, N,N-bis-(β-cyano-ethyl-3-acetylamino-aniline, N,N-bis-(β-acetoxyethyl)-3-benzoylamino-aniline, N-ethyl-N-(β-cyanoethyl)-3-propionylamino-aniline, N,N-diethyl-3-(hydroxyacetylamino)-aniline, N,N-diethyl-3-(β-cyanoacetylamino)-aniline, N,N-diethyl-3-(γ-chloropropionylamino)-aniline, N,N-diethyl-3-(acetoxyacetylamino)-aniline, N,N-diethyl-3-(ethoxyacetylamino)-aniline, N,N-diethyl-3-(phenoxyacetylamino)-aniline, N,N-diethyl-3-(methylsulphonylamino)-aniline, N,N-diethyl-3-(phenylsulphonylamino)-aniline, N,N-dimethyl-3-(N'-methyl-N'-acetylamino)-aniline, 3-(N,N-diethylamino)-phenylurea, 3-[N,N-bis-(β-acetoxyethyl)-amino]-phenyl-N',N'-dimethyl-urea, N,N-diethyl-3-(methoxycarbonylamino)-aniline, N,N-dimethyl-3-(phenoxycarbonylamino)-aniline, N,N-diethyl-3-(β-chloropropionylamino)-aniline, N,N-diethyl- 3-(dimethylaminosulphonylamino)-aniline, N-ethyl-N-(β-N'-succinimidoethyl)-3-acetylamino-aniline, N-ethyl-N-benzyl-3-acetylamino-aniline, N-(β-methoxyethoxycarbonyl)-ethyl)-2-methoxy-5-acetylamino-aniline, N-(β-hydroxy-γ-methoxy-propyl)-2-methoxy-5-acetylamino-aniline, N-β-hydroxy-γ-phenoxy-propyl)-2-methoxy-5-acetylamino-aniline, N,N-diethyl-2-methoxy-5-acetylamino-aniline, N,N-bis-(β-acetoxyethyl)-2-ethoxy-5-acetylamino-aniline, N,N-bis-(β-[ethoxy-carbonyloxy)-ethyl]-2-ethoxy-5-acetylamino-aniline, N,N-bis-(β-hydroxy-ethyl)-2-ethoxy-5-acetylamino-aniline, N,N-dimethyl-2-phenoxy-5-formylamino-aniline, N-(β-hydroxyethyl)-2-methyl-5-acetylamino-aniline, N,N-bis-(β-methoxyethyl)-2-methoxy-5-acetylamino-aniline, N,N-bis-(β-(n-propoxycarbonyloxy)-ethyl)-2-ethoxy-5-acetyl-amino-aniline, N,N-diethyl-2,5-dimethoxy-aniline, N-(β-hydroxyethyl)-N-(β-cyanoethyl)-2-methoxy-5-acetylamino-aniline, 3-acetylamino-diphenylamine, N-ethyl-N-(β-hydroxyethyl)-3-acetylamino-aniline, N-(methyl- or ethyl)-N-(β-acetoxyethyl)-3-acetylaminoaniline, N-(methyl- or ethyl)-N-(β-carbomethoxyethyl)-3-acetylamino-aniline, N-ethyl-N-(β,γ-dihydroxypropyl)-2-methoxy-5-formylamino-aniline and N,N-dibenzyl-2-methoxy-5-acetylamino-aniline.

Amongst the series of the pyridones there may be mentioned: 2,6-dihydroxy-3-cyano-4-methyl-pyridine, N-methyl-3-cyano-4-methyl-6-hydroxy-pyridone-2, N-ethyl-3-cyano-4-methyl-6-hydroxy-pyridone-2, N-β-methoxyethyl-3-cyano-4-methyl-6-hydroxy-pyridone-2, N-β-hydroxyethyl-3-cyano-4-methyl-6-hydroxypyridone-2, N-butyl-3-cyano-4-methyl-6-hydroxypyridone-2 and N-phenyl-3-cyano-4-methyl-6-hydroxypyridone-2.

As examples from the series of the enolisable keto compounds there may be mentioned: acetylacetone, benzoylacetone, acetoacetic acid methyl ester and ethyl ester, acetoacetic acid anilides and its derivatives which are substituted in the anilide radical by methyl, methoxy and chlorine, and indanedione and dimedone. Phenols which can be used are: phenol, o-, m- and p-cresol, salicyclic acid methyl ester, resorcinol, 2-nitro-resorcinol, hydroquinone monomethyl ether and monoethyl ether, and 1-hydroxy-4-(β-cyanoethyl)-benzene. As examples of naphthols there may be mentioned: β-naphthol, 2,6-dihydroxy-naphthalene, 2-hydroxy-6-methoxy-naphthalene, 2-hydroxy-naphthalene-5 (or 6)-sulphonic acid diethylamide, 2-hydroxy-naphthalene-3-carboxylic acid methyl ester, 2-hydroxy-naphthalene-3-carboxylic acid anilide and its derivatives substituted in the anilide radical by methyl, methoxy, ethoxy or chlorine.

Further possible coupling components are: indole, 2-methyl-indole, 2,5-dimethyl-indole, 2,4-dimethyl-7-methoxy-indole, 2phenyl-indole, 2-phenyl-5-ethoxy-indole, 2-methyl-5- or 6-chloro-indole, 1,2-dimethyl-indole, 1-methyl-2-phenyl-indole, 2-methyl-5-nitro-indole, 2-methyl-5-carbomethoxy-indole, 2-methyl-indoline, 1,2,3,5-tetrahydroquinoline and its derivatives, such as N-ethyl-1,2,3,4-tetrahydro-quinoline, N-(β-hydroxyethyl)-1,2,3,4-tetrahydroquinoline, N-benzyl-1,2,3,4-tetrahydroquinoline, N-(β-acetoxyethyl)-1,2,3,4-tetrahydroquinoline and N-(β-cyanoethyl)-7-acetylamino-1,2,3,4-tetrahydroquinoline, pyrazolones, such as, for example, 3-methyl-pyrazolone-(5), 1-phenyl-3-methyl-pyrazolone-(5), 1-(β-cyanoethyl)-3-methyl-pyrazolone-(5), 1,3-dimethylpyrazolone-(5), 1-(β-acetoxyethyl)-3-methyl-pyrazolone-(5), 1-(o-chlorophenyl)-3-methyl-pyrazolone-(5), 1-phenyl-3-carbomethoxy-pyrazolone-(5), 1-phenyl-5-amino-pyrazole, 1-(3-aminophenyl)-pyrazolone-(5), 1-(4-aminophenyl)-pyrazolone-(5), 3-methyl-pyrazolone-(5)-1-carboxylic acid amidine, 1-phenyl-pyrazolone-(5)-3-carboxylic acid amide, 2-methyl-4H-pyrazolo[2,3-a]-benzimidazole and [1-(3-thia-cyclopentyl)-3-methyl-pyrazolone-(5)-S-dioxide[; pyridines, such as 2,6-dihydroxy-3-cyano-4-methyl-pyridine and N-(methyl-, ethyl- or phenyl-)(-6-hydroxy-3-cyano-pyridone-(2); quinolines, such as 8- hydroxy-quinoline, 2,4-dihydroxy-quinoline and N-(methyl- or n-butyl-(-4-hydroxy-quinolone-(2); pyrimidines such as barbituric acid or 2,6-bis-methylamino-4-phenyl-amino-pyrimidine, 2-ethylamino-4-phenylamino-6-phenoxy-pyrimidine and 2,4-bis-ethylamino-6-phenylamino-pyrimidine, imidazole, 4,5-dimethylimidazole, 4,5-diphenyl-imidazole, 4-methyl-imidazole and 4-phenyl-imidazole; thiazoles, such as 2-hydroxy-4(methyl or phenyl)-thiazole, 2-methylamino-4-(methyl or- phenyl)-thiazole and 2-(β-cyanoethylamino)-4-(methyl or phenyl)-thiazole.

The diazo components (V) are only known in part (compare J. prakt. Chemie 313, 678 (2971).

The anilines (V) which have not been described previously are, however, obtained easily in a manner which is in itself known by reacting compounds of the formula

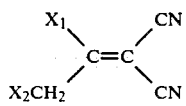

VII wherein

X₁ and X₂ have the abovementioned meaning with compounds of the formula

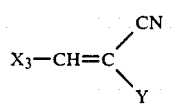

VIII wherein

X₃ has the abovementioned meaning, but does not represent hydrogen and

Y denotes nitrile or lower alkoxycarbonyl in the presence of organic bases, and subjecting the reaction product to a heat treatment in the presence of alkali metal hydroxides or alkaline earth metal hydroxides.

Preparative details of this synthesis and of its mechanism are described in the journal quoted above.

The anilines (V) are obtained in a particularly advantageous manner if, in a one-pot reaction, a mixture of (a) one equivalent of a compound of the formula $$X_1-C=O$$
$$\phantom{X_1-}|$$
$$X_2-CH_2$$

IX wherein

X₁ and X₂ have the abovementioned meaning, (b) one equivalent of a compound of the formula $$X_3-CH=O$$

X wherein

X₃ has the abovementioned meaning and (c) two equivalents of malodinitrile (XI) or one equivalent of malodinitrile and one equivalent of cyanoacetic ester are reacted in the presence of bases and the reaction product of the formula

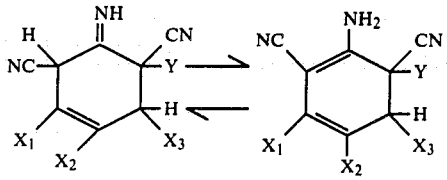

wherein

Y represents CN, COOCH₃ or COOC₂H₅ and

X₁—X₃ have the abovementioned meaning is aromatised —if necessary after an intermediate isolation - by means of alkali metal hydroxides or alkaline earth metal hydroxides, at temperatures above 50° C.

The particular advantage of this method is, inter alia, that formaldehyde can also be employed as (X), giving the hitherto unknown anilines with X₃=H, which are also a subject of the present invention.

The fact that the reaction, which is in itself known, takes place so smoothly even when using formaldehyde as X, with formation of V, must be described as distinctly surprising, since it could have been expected that under the reaction conditions (basic medium) formaldehyde would undergo undesired side-reactions.

Suitable compounds of the formula IX are: methyl ethyl ketone, diethyl ketone, i-butyl n-propyl ketone, i-pentyl ethyl ketone, cyclopentanone, cyclohexanone and cycloheptanone.

Suitable compounds of the formula X are: formaldehyde, acetaldehyde and benzaldehyde.

Suitable bases are: piperidine, morpholine, pyrrolidine, methylamine, dimethylamine, trimethylamine, diethylamine, triethylamine and ammonia.

They are preferably employed in amounts of 2-100 percent by weight.

The reaction of IX, X and XI is preferably carried out in water or water-miscible organic solvents, such as methanol, ethanol, isopropanol, dioxane or tetrahydrofurane or their mixtures.

The reaction of IX, X and XI to give the dienes (XII) is an exothermic reaction, which is carried out with external cooling in such a way that the temperature of the reaction mixture does not rise above 50° C. The subsequent aromatisation to the aniline (V) is preferably carried out at 80°-120° C. The alkali metal hydroxides or alkaline earth metal hydroxides required for this aromatisation are employed in at least stoichiometric amounts, relative to the diene (XII). Suitable hydroxides are: NaOH, KOH and Ca(OH)₂.

The new water-insoluble dyestuffs, their mixtures with one another and their mixtures with other dyestuffs are outstandingly suitable —especially when in a finely divided form, for dyeing synthetic fibres and fabrics of cellulose triacetate and cellulose 2½-acetate, of polyurethanes and especially of polyamides such as, for example, polycaprolactam, polyhexmethylenediamine adipate or poly-ξ-amino-undecanoic acid, and of aromatic polyesters, such as polyethylene terephthalate and poly-1,4-cyclohexanedimethylene terephthalate, in accordance with the aqueous dyeing rocess customary for these types of fibre.

The dyestuffs according to the invention which have an ammonium group in the molecule are in particular suitable for dyeing fibres and fabrics of polyacarylonitrile or of copolymers of acrylonitrile and other vinyl compounds, such as acrylic esters, acrylamides, vinyl chloride, vinylidene chloride and vinylpyridine, or of copolymers of dicyanoethylene and vinyl acetate, and also for dyeing acid-modified polypropylene, polyester or polyamide fibres.

Some types of dyestuff of the formula I, especially those having a pyridone or barbituric acid coupling component, are also outstandingly suitable for dyeing from organic waterimmiscible solvents, preferably tetrachloroethylene, by the customary exhaustion process.

The new water-insoluble dyestuffs can also be used for the spin dyeing of polyamides, polyesters, polyurethanes and polyolefines.

Printing is also carried out in a manner which is in itself known. For this there is used, for example, a printing ink which contains—in addition to the dyestuff—the auxiliaries customary in printing, and which is applied to the materials to be printed and fixed by a subsequent heat treatment.

The resulting dyeings and prints are distinguished by a particularly clear colour shade, good affinity and good general fastness properties. They can be subjected to an after-treatment by treating them with detergents or reducing agents, whereby, in some cases, an improvement of some fastness properties, such as fastness to rubbing, sublimation, wet processing and light, can be achieved.

The dyestuffs obtained in accordance with the process, and possessing an ammonium group in the coupling component preferably contain, as the anion, the radical of a strong acid, for example of sulphuric acid or its half-esters, or of an arylsulphonic acid or of phosphoric acid, or a halogen ion. The anions mentioned, which are introduced into the dyestuff molecule in accordance with the process, can also be replaced by anions of other acids, for example of organic acids such as of formic acid, acetic acid, lactic acid or tartaric acid. The dyestuff salts can also be used in the form of double salts, especially with zinc chloride.

Dyestuffs which are derived from coupling components containing sulpho groups are suitable for dyeing synthetic and natural polyamide fibres.

Some types of dyestuff according to the invention, especially those with coupling components of the acetoacetic acid aniline series and 2-hydroxy-naphthalene-3-carboxylic acid anilide series are valuable pigment dyestuffs which are outstandingly suitable for the manufacture of lacquers of very diverse kinds, and for the colouring of thermoplastics.

(I) PREPARATION OF THE AZO DYESTUFFS (a) 2.68 parts of 6-amino-5,7-dicyano-indane are dissolved in 10 parts of concentrated sulphuric acid at 0–3° C. and 5 parts of nitrosylsulphuric acid are added. The solution is stirred for 1 hour and is then poured out onto 40 parts of ice. Excess nitrous acid is decomposed with amidosulphonic acid.

The diazonium salt solution thus prepared is added to an aqueous solution/suspension of 2.18 g of 4-methyl-3-cyano-6-oxy-pyridone-2 in 200 parts of water. During coupling care is taken to ensure that the pH value of the reaction mixture is about 5-6, by adding saturated sodium acetate solution. A yellow, crystalline precipitate is obtained, which is filtered off, washed with a little water and dried. About 4 parts of the dyestuff of the formula

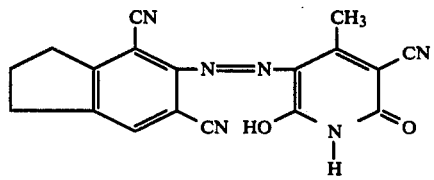

are obtained. The dyestuff dyes polyester fibres in greenish-tinged yellow shades. The dyeings show good fastness properties in use.

(b) Further valuable dyestuffs are obtained when instead of the abovementioned diazo and coupling components the starting materials listed in the table which follows are employed.

| | Diazo component | Coupling component | Colour shade on polyester |
|---|---|---|---|
| (1) | C₂H₅, CN, NH₂, H₃C, CN (substituted benzene) | CH₃, CN, HO, N-H, =O (pyridone) | greenish-tinged yellow |
| (2) | " | OH, CONH₂, HO, N, OH (pyridine) | yellow |
| (3) | " | OH, CONHCH₃, HO, N-CH₃, =O (pyridone) | yellow |

-continued

| | Diazo component | Coupling component | Colour shade on polyester |
|---|---|---|---|
| (4) | " | 3-carbethoxy-2,4,6-trihydroxypyridine (OH, COOC₂H₅, HO, N, OH) | yellow |
| (5) | " | 1-ethyl-3-(N-ethylcarbamoyl)-4-hydroxy-6-hydroxy-2-pyridone (OH, CONHC₂H₅, HO, N(C₂H₅), =O) | yellow |
| (6) | 2-amino-3-ethyl-5-methyl-1,4-dicyanobenzene | 1-butyl-3-cyano-4-methyl-6-hydroxy-2-pyridone (CH₃, CN, HO, N(C₄H₉), =O) | yellow |
| (7) | " | 2,4,6-trihydroxypyridine | greenish-tinged yellow |
| (8) | " | 1,3-dimethylbarbituric acid | greenish-tinged yellow |
| (9) | " | 3-methylpyrazol-5-one | yellow |
| (10) | " | 4-phenyl-3-cyano-6-hydroxy-2-pyridone | yellow |
| (11) | 2-amino-4,6-dicyano-indane | 1-ethyl-3-(N-ethylcarbamoyl)-4,6-dihydroxy-2-pyridone | yellow |
| (12) | " | 3-carbomethoxy-4-methyl-6-hydroxy-2-pyridone | yellow |

-continued
| | Diazo component | Coupling component | Colour shade on polyester |
|---|---|---|---|
| (13) | " | 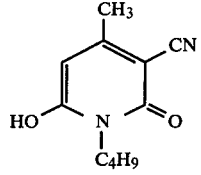 | yellow |
| (14) | " | 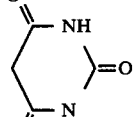 | yellow |
| (15) | " | 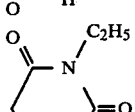 | yellow |
| (16) | 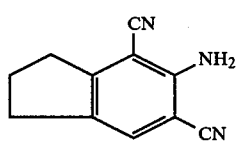 | 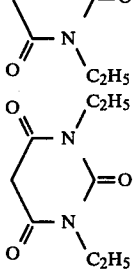 | yellow |
| (17) | " | 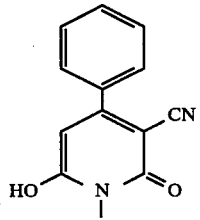 | yellow |
| (18) | " | 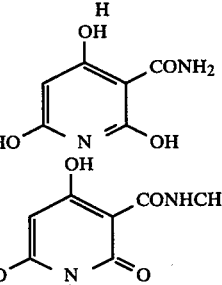 | yellow |
| (19) | " | 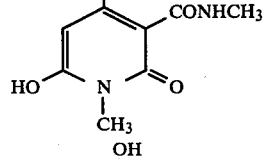 | yellow |
| (20) | " | 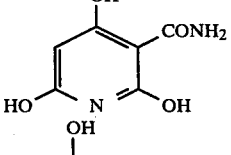 | yellow |
| (21) | 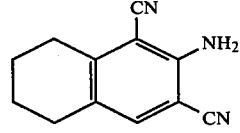 | 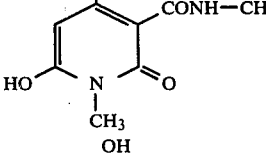 | yellow |
| (22) | " | 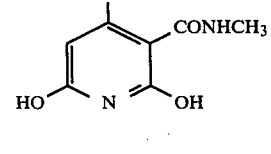 | yellow |

-continued

| | Diazo component | Coupling component | Colour shade on polyester |
|---|---|---|---|
| (23) | " | 4-hydroxy-6-hydroxy-3-(CONHC$_2$H$_5$)-1-ethyl-pyridin-2-one | yellow |
| (24) | " | 4-methyl-3-cyano-6-hydroxy-pyridin-2-one (NH) | yellow |
| (25) | " | 4-methyl-3-cyano-6-hydroxy-1-butyl-pyridin-2-one | yellow |
| (26) | 2-amino-1,3-dicyano-5,6,7,8-tetrahydronaphthalene | barbituric acid | yellow |
| (27) | " | 1,3-dimethyl barbituric acid | yellow |
| (28) | " | 1,3-diethyl barbituric acid | yellow |
| (29) | " | 4-phenyl-3-cyano-6-hydroxy-pyridin-2-one (NH) | yellow |
| (30) | 2-amino-1,3-dicyano-4-phenyl-5,6,7,8-tetrahydronaphthalene | 4-methyl-3-cyano-6-hydroxy-pyridin-2-one (NH) | yellow |
| (31) | " | 4-methyl-3-cyano-6-hydroxy-1-ethyl-pyridin-2-one | yellow |

-continued

| | Diazo component | Coupling component | Colour shade on polyester |
|---|---|---|---|
| (32) | 5,6,7,8-tetrahydronaphthalene with 1-CN, 2-NH₂, 3-CN, 4-C₆H₅ substituents | 1-C₄H₉-3-cyano-4-methyl-6-hydroxy-2-pyridone | yellow |
| (33) | " | 2,4,6-trihydroxy-pyridine-3-carboxamide | yellow |
| (34) | " | 3-cyano-6-hydroxy-4-phenyl-2-pyridone | yellow |
| (35) | " | barbituric acid (N,N'-H) | yellow |
| (36) | " | 1,3-dimethylbarbituric acid | yellow |
| (37) | " | 1,3-diethylbarbituric acid | yellow |
| (38) | 5,6,7,8-tetrahydronaphthalene with 1-CN, 2-NH₂, 3-CN, 4-C₆H₅ substituents | N,N-diethylaniline | red |
| (39) | " | N,N-diethyl-3-methylaniline | bluish-tinged red |
| (40) | " | C₆H₅—NH—CH₂CH₂—CN | reddish-tinged orange |
| (41) | " | N-ethyl-N-(2-acetoxyethyl)aniline | red |

-continued

| | Diazo component | Coupling component | Colour shade on polyester |
|---|---|---|---|
| (42) | " | 4-OCH₃, 3-N(CH₂CH₂—O—COOCH₃)₂, 1-NHCOCH₃ phenyl | violet |
| (43) | " | C₆H₅—N(C₂H₅)(CH₂CH₂—O—CO—CH₂—C₆H₅) | red |
| (44) | " | C₆H₅—N(C₂H₅)(CH₂—C₆H₅) | red |
| (45) | 2-amino-4-phenyl-1,3-dicyano-5,6,7,8-tetrahydronaphthalene | C₆H₅—N(C₂H₅)(CH₂CH₂—C₆H₅) | red |
| (46) | " | C₆H₅—N(C₂H₅)₂ | red |
| (47) | " | C₆H₅—N(C₂H₅)(CH₂CH₂—CN) | yellowish-tinged red |
| (48) | " | C₆H₅—N(C₂H₅)(CH₂CH₂—O—COCH₃) | red |
| (49) | " | C₆H₅—N(C₂H₅)(CH₂CH₂—O—CO—CH₂—C₆H₅) | red |
| (50) | 2-amino-1,3-dicyano-5,6,7,8-tetrahydronaphthalene (4-H) | C₆H₅—N(C₂H₅)₂ | red |
| (51) | " | C₆H₅—N(C₂H₅)(CH₂CH₂—CN) | yellowish-tinged red |
| (52) | " | C₆H₅—N(C₂H₅)(CH₂CH₂—O—COCH₃) | red |
| (53) | 2-amino-1,3-dicyano-5,6,7,8-tetrahydronaphthalene | C₆H₅—N(C₂H₅)(CH₂CH₂—OCO—CH₂—C₆H₅) | red |

-continued

| | Diazo component | Coupling component | Colour shade on polyester |
|---|---|---|---|
| (54) | " | Phenyl-N(C₂H₅)-CH₂CH₂—OCO—CH₂—O—phenyl | red |
| (55) | " | Phenyl-N(C₂H₅)-CH₂CH₂—OCO—phenyl | red |
| (56) | " | Phenyl-N(C₂H₅)-CH₂CH₂—OCO—(3-methylphenyl) | red |
| (57) | " | Phenyl-N(C₂H₅)-CH₂CH₂—OCO—(4-methylphenyl) | red |
| (58) | " | Phenyl-N(C₂H₅)-CH₂CH₂—OCO—(2-methylphenyl) | bluish-tinged red |
| (59) | 2-amino-1,3-dicyano-5,6,7,8-tetrahydronaphthalene | 2-OCH₃, 4-NHCOCH₃ phenyl-N(CH₂CH₂—O—COOCH₃)₂ | violet |
| (60) | " | (3-methylphenyl)-N(C₂H₅)-CH₂CH₂CN | red |
| (61) | " | phenyl-NH—CH₂CH₂—CN | red |
| (62) | 2-amino-1,3-dicyano-5,6-dihydro-4H-indene | phenyl-N(C₂H₅)-CH₂CH(OCOCH₃)—CH₂—O—phenyl | red |
| (63) | " | phenyl-N(C₂H₅)-CH₂CH₂—O—CO—OC₂H₅ | red |
| (64) | 2-amino-3-methyl-5-ethyl-1,6-dicyanobenzene | phenyl-N(C₂H₅)₂ | red |

-continued

| | Diazo component | Coupling component | Colour shade on polyester |
|---|---|---|---|
| (65) | 2-amino-3,5-disubstituted benzene with CN groups: H$_3$C, H$_5$C$_2$, CN, NH$_2$, CN | N(C$_2$H$_5$)(CH$_2$-phenyl)-phenyl | red |
| (66) | " | N(C$_2$H$_5$)(CH$_2$CH$_2$-O-phenyl)-phenyl | red |
| (67) | " | N(C$_2$H$_5$)(CH$_2$CH$_2$-O-CO-C$_6$H$_4$-Cl)-phenyl | red |
| (68) | " | N(C$_2$H$_5$)(CH$_2$CH$_2$-O-CO-CH$_2$)-phenyl | red |
| (69) | " | 3-methyl-phenyl-N(CH$_2$CH$_2$-OCOCH$_3$)$_2$ | red |
| (70) | " | 5-amino-3-methyl-1-phenyl-pyrazole | greenish-tinged yellow |
| (71) | 2-amino-5,6,7,8-tetrahydronaphthalene-1,3-dicarbonitrile | 5-amino-3-methyl-1-phenyl-pyrazole | greenish-tinged yellow |
| (72) | 2-amino-5,6,7,8-tetrahydronaphthalene-1,3-dicarbonitrile | 3-cyano-6-hydroxy-4-methyl-2-pyridone | greenish-tinged yellow |
| (73) | " | 1-n-butyl-2,4-dioxo-1,2,3,4-tetrahydroquinoline | yellow |
| (74) | " | 1-methyl-6-methoxy-2,4-dioxo-1,2,3,4-tetrahydroquinoline | yellow |
| (75) | 2-amino-5,6,7,8-tetrahydronaphthalene-1,3-dicarbonitrile (H indicated) | 1-ethyl-3-cyano-6-hydroxy-4-methyl-2-pyridone | greenish-tinged yellow |

-continued

| | Diazo component | Coupling component | Colour shade on polyester |
|---|---|---|---|
| (76) | " | 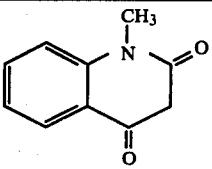 | yellow |
| (77) | " | 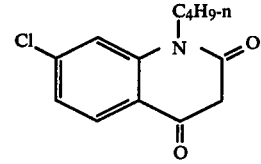 | yellow |
| (78) | 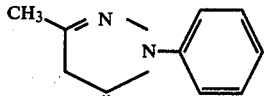 | 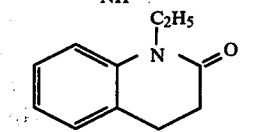 | greenish-tinged yellow |
| (79) | " | 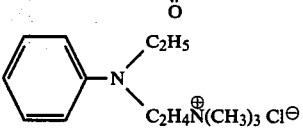 | yellow |
| (80) |  |  | red |

II. DYEING EXAMPLES (a) Polyester 0.1 g of the well-dispersed dyestuff according to Example 53 is introduced into 1 l of water at 40° C., which additionally contains 0.2 g of sodium dinaphthylmethanesulphonate and 0.3 g of cresotic acid methyl ester. 10 g of a polyethylene terephthalate fabric is introduced into this bath, the temperature of the dye bath is raised to 100° C. over the course of approx. 20 minutes and the fabric is dyed at ths temperature for 60–90 minutes. A strong red dyeing having good fastness properties in use is obtained.

If, in this example, the substrate is replaced by 10 g of a cellulose triacetate fabric, a clear red dyeing with good general fastness properties is again obtained.

(b) Polyamide 0.1 g of the dyestuff according to Example 64, in a well-dispersed form, is introduced into 1 l of water at 40°–50° C., which also contains 0.5 g of a sulphite cellulose degradation product. 20 g of poly-ξ-caprolactam yarn are introduced into this bath, the temperature is raised to 95°–100° C. over the course of approx. 20 minutes and the yarn is dyed for 1 hour. After rinsing and drying a clear, red dyeing with good general fastness properties results.

(c) Polyacrylonitrile 0.5 g of the dyestuff according to Example 71 is dissolved in 3 l of water, with addition of 3 ml of 30% strength acetic acid. 100 g of polyacrylonitrile yarn are introduced into this bath at 40°–50° C., the temperature of the dye bath is raised to 100° C. over the course of approx. 40 minutes and the yarn is dyed at this temperature for about 1 hour. A clear red dyeing with excellent fastness properties results.

Fibre materials of acid-modified polyester can be dyed by the same process.

(d) Polyester (from solvent):

100 parts of a polyethylene terephthalate fibre fabric are introduced into a dye bath, at room temperature, which is prepared from 1 part of the monoazo dyestuff of Example I a and 1,000 parts of tetrachloroethylene. The bath is heated to 110° C. over the course of 20 minutes, with vigorous circulation of the liquor and is kept at this temperature for 45 minutes. The liquor is then separated off and the fabric is rinsed with fresh tetrachloroethylene at 40° C. After separating off the rinsing liquor, the dyed goods are freed from adhering solvent by centrifuging and drying in a stream of air. A full, brilliant yellow dyeing of outstanding general fastness properties is obtained.

III PREPARATION OF THE NEW DIAZO COMPONENTS (a) 6-Amino-5,7-dicyano-4-phenyl-indane 1 mol (84 g) of cyclopentanone, 1 mol (106 g) of benzaldehyde and 2 mols (132 g) of malonic acid dinitrile are dissolved in 1 l of methanol and 60 ml of morpholine are added dropwise over a period of approx. 2 hours in such a way that the temperature of the reaction mixture does not exceed 45° C. The mixture is then stirred for a further 8 hours and the precipitate which forms during the reaction is filtered off. The filter residue is heated in 2 l of ethanolic KOH for 10 minutes under reflux, the reaction mixture is poured out onto ice/water, the pH is adjusted to 2 with dilute sulphuric acid and the product is filtered off. 155 g of 6-amino-5,7- dicyano-4-phenyl-indane (60% of theory) are obtained, melting point 148°-149° C. (from benzene).

(b) 3-Ethyl-4-methyl-2,6-dicyanoaniline

Molar amounts of 1,1-dicyano-2,2-diethylethylene, malodinitrile and formaldehyde (in the form of a 40% strength by volume aqueous solution) are dissolved in 500 ml of methanol, whilst stirring. 60 ml of approx. 50% strength aqueous dimethylamine solution are then added dropwise, whilst cooling, in such a way that the temperature of the reaction mixture does not rise above 45° C. The mixture is then stirred for a further 4 hours at room temperature, during which an orange-yellow crystalline precipitate separates (if necessary after seeding) out of the dark solution. This precipitate is isolated by filtration, washed with a little methanol and dried. 1-Amino-2,6,6-tricyano-3-ethyl-4-methyl]cyclohexadiene-1,3 is thus obtained in approx. 65% yield. Melting point 168°-160° C. (from n-butanol).

The aromatisation to give 3-ethyl-4-methyl-2,6-dicyanoaniline (melting point 121°-123° C.) is effected by heating in ethanolic KOH in accordance with the method indicated in Example IIIa.

The following compounds can be synthesised analogously using corresponding starting materials:

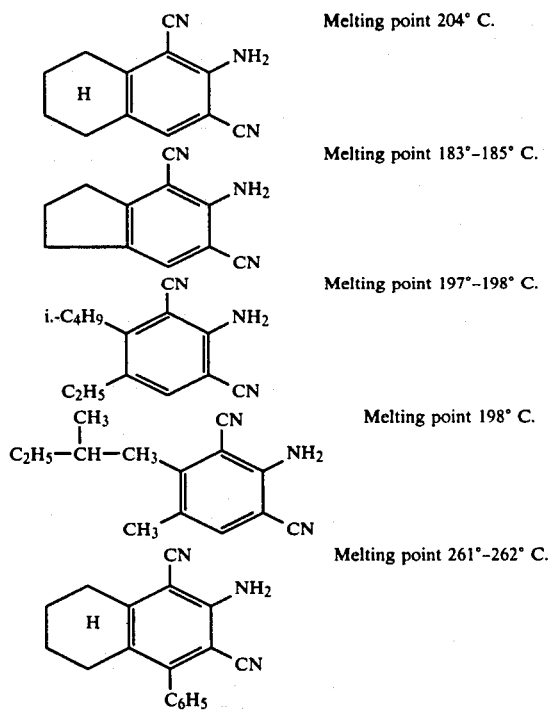

Melting point 204° C.

Melting point 183°-185° C.

Melting point 197°-198° C.

Melting point 198° C.

Melting point 261°-262° C.

I claim:

1. Azo dyestuff of the formula

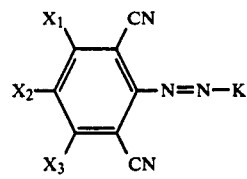

wherein $X_1$ and $X_2$ taken together have the formula $-(CH_2)_n-$ and form the remaining members of a carbocyclic ring system;

n is 3, 4 or 5;

$X_3$ is H; and

K is the radical of a coupling component.

2. Azo dyestuff according the claim 1 wherein $X_1$ and $X_2$ conjointly are $-(CH_2)_3-$ or $-(CH_2)_4-$; K represents the radical of the formula

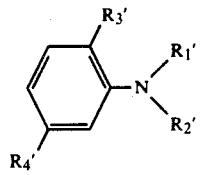

in which $R_1'$ and $R_2'$ represents hydrogen, $-C_3$, $-C_2H_5$, $-C_3H_7$, $-C_4H_9$, $-CH_2C_6H_5$, $-Ch_2C-H_2OCOCH_3$, $-CH_2CH_2OCOC_2H_5$, $-CH_2C-H_2OCOC_6H_5$, $-CH_2CH_2OCOCH_2C_6H_5$, $-CH_2CH_2OCOCH_2OC_6H_5$, $-CH_2C-H_2OCOOCH_3$, $-CH_2CH_2OCOOC_2H_5$, $-CH_2CH_2COOCH_3$, $-CH_2CH_2COOC_2H_5$, $-CH_2CH_2CN$, $-CH_2CH_2OCH_2CH_2OH$, $-CH_2CH_2OCH_2CH_2OCOOCH_3$, $-CH_2C-H_2OCH_2CH_2CN$,

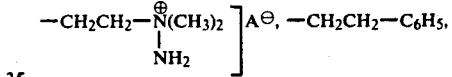

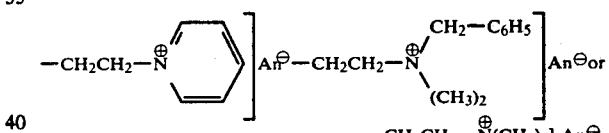

$R_3'$ denotes hydrogen, $-CH_3$, $-C_2H_5$, $-OCH_3$, $-OC_2H_5$, $-OCH_2CH_2CN$ or $-Cl$ and $R_4'$ denotes hydrogen, $-CH_3$, $-C_2H_5$, $-OCH_3$, $-OC_2H_5$, $Cl$, $-NHCOC_nH_{2n+1}$, with n being 0-4, $-NHCOCH_2Cl$, $-NHCOCH_2OH$, $-NHCOCH_2OCOCH_3$, or $-NHCOC_6H_5$; and $An^{\ominus}$ is an anion.

3. Azo dyestuff of claim 1 wherein K is a radical of the formula

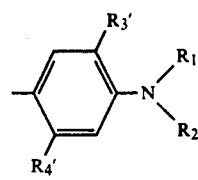

in which $R_1'$ and $R_2'$ are hydrogen, $-CH_3$, $-C_2H_5$, $-C_3H_7$, $-C_4H_9$, $-CH_2C_6H_5$, $-CH_2CH_2OCOCH_3$, $-CH_2CH_2OCOC_2H_5$, $-CH_2CH_2OCOC_6H_5$, $-CH_2CH_2OCOCH_2C_6H_5$, $-CH_2CH_2OCOCH_2OC_6H_5$, $-CH_2CH_2OCOOCH_3$, $-CH_2C-H_2OCOOC_2H_5$, $-CH_2CH_2COOCH_3$, $-CH_2CH_2COOC_2H_5$, $-CH_2CH_2CN$, $-CH_2CH_2OCH_2C-

H₂OH, —CH₂CH₂OCH₂CH₂OCOOCH₃, —CH₂CH₂OCH₂CH₂CN,

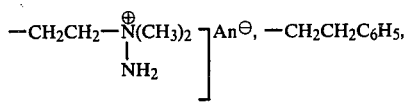

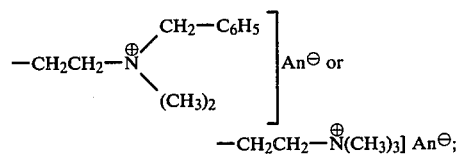

$R_3'$ is hydrogen, —CH₃, —CH₂H₅, —OCH₃, —OC₂H₅, —OCH₂CH₂CN or —Cl;

$R_4'$ is hydrogen; —CH₃; —C₂H₅; —OCH₃; —OC₂H₅; Cl; —NHCOC$_n$H$_{2n-1}$; with n being 0-4; —NHCOCH₂Cl; —NHCOCH₂OH; —NHCOCH₂OCOCH₃; or —NHCOC₆H₅; and An⊖ is an anion.

4. Azo dyestuffs according to claim 1, wherein K represents the radical of the formula

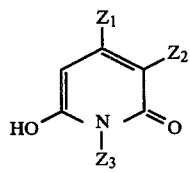

wherein $Z_1$ denotes OH, $C_1$14 $C_4$-alkyl or phenyl which is optionally substituted by $C_1$-$C_4$-alkyl, $C_1$-$C_4$-alkoxy, F, Cl or Br, $Z_2$ denotes nitrile, aminocarbonyl, $C_1$14 $C_4$-alkylaminocarbonyl, $C_1$-$C_4$-alkylcarbonyl, benzoyl or $C_1$-$C_4$-alkoxycarbonyl and $Z_3$ denotes hydrogen, $C_1$-$C_4$-alkyl which is optionally substituted by OH, CN or Cl, cyclohexyl, phenyl-$C_1$-$C_4$-alkyl, $C_1$-$C_4$-alkoxy or Cl-substituted phenyl, and $X_1$-$X_3$ have the meaning indicated in claim 1.

5. Azo dyestuffs according to claim 4, wherein
$Z_1$ =Ch₃,
$Z_2$ =CN,
$Z_3$ =H or $C_1$14 $C_2$-alkyl.

6. Azo dyestuff according to claim 1, of the formula

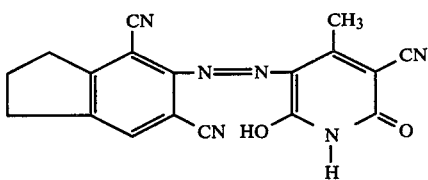

7. Azo dyestuff according to claim 1, of the formula

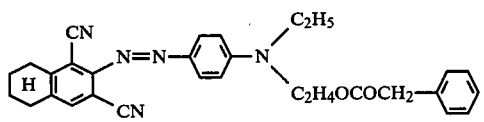

* * * * *

UNITED STATES PATENT AND TRADEMARK OFFICE
CERTIFICATE OF CORRECTION

PATENT NO. : 4,189,427
DATED : Feb. 19, 1980
INVENTOR(S) : Klaus Komorowski

It is certified that error appears in the above–identified patent and that said Letters Patent are hereby corrected as shown below:

Column 28, Line 20   Delete "$-C_3$" and insert -- $-CH_3$ --.

Column 29, Line 20   Delete "$NHCOC_nH_{2n}-1$" and insert -- $-NHCOC_nH_{2n+1}$ --.

Column 30, Line 1    Delete "$C_1 14$" and insert -- $C_1-$ --.

Column 30, Line 4    Delete "$C_1 14$" and insert -- $C_1$ --.

Column 30, Line 15   Delete "$C_1 14$" and insert -- $C_1$ --.

Signed and Sealed this

Twelfth Day of May 1981

[SEAL]

Attest:

RENE D. TEGTMEYER

Attesting Officer    Acting Commissioner of Patents and Trademarks